United States Patent [19]
Milton et al.

[11] Patent Number: 4,862,452
[45] Date of Patent: Aug. 29, 1989

[54] DIGITAL SIGNAL PROCESSING SYSTEM

[75] Inventors: A. David Milton; Jerry Stroobach, both of Kanata, Canada

[73] Assignee: Mitel Corporation, Kanata, Canada

[21] Appl. No.: 142,816

[22] Filed: Jan. 11, 1988

[30] Foreign Application Priority Data

Jan. 23, 1987 [CA] Canada .................................. 528063

[51] Int. Cl.⁴ ........................................... H04Q 11/04
[52] U.S. Cl. ..................................... 370/62; 370/68.1
[58] Field of Search ............... 370/62, 84, 68.1, 110.1, 370/110.2, 110.3; 379/290

[56] References Cited

U.S. PATENT DOCUMENTS

| | | | |
|---|---|---|---|
| 4,339,633 | 7/1982 | Ahmed ................................... | 370/85 |
| 4,653,045 | 3/1987 | Stanley et al. ......................... | 370/62 |
| 4,745,601 | 5/1988 | Diaz et al. .............................. | 370/84 |

FOREIGN PATENT DOCUMENTS 1171946  7/1984  Canada .

*Primary Examiner*—Douglas W. Olms
*Assistant Examiner*—Melvin Marcelo

*Attorney, Agent, or Firm*—Sandler & Greenblum

[57] ABSTRACT

A digital signal processing system for use as a digital service unit within a communication switching system, comprised of a plurality of digital signal processing (DSP) modules for connection via a dedicated programmable digital switch forming part of a circuit switch matrix, to one or more input/output ports such as line circuits, trunk circuits, etc., under control of a main system controller, such as a microprocessor. Applications programs for implementing predetermined service features, are downloaded from the main controller via the circuit switch matrix and digital switch, to one or more of the digital signal processing modules for storage within internal memories thereof. The main controller dynamically allocates circuit switch and message channels of the programmable digital switch in accordance with the signal bandwidth and computation power required to implement the predetermined service features. Thus, an extremely high signal bandwidth efficiency is obtained for performing various service features such as tone generation and detection. DTMF tone detection, digital conferencing, speech synthesis, etc., utilizing simple, inexpensive, time-shared modules.

19 Claims, 3 Drawing Sheets

DIGITAL SIGNAL PROCESSING SYSTEM

This invention relates to telephone systems in general, and more particularly to a digital signal processing system for use as a digital service unit within a communications switching system.

Digital service units (DSUs) are used in a modern day communications systems such as PABXs, to provide such features as tone generation, tone detection, and conferencing.

Prior art DSUs typically incorporated a plurality of circuits dedicated to provision of respective ones of the aforementioned features. Tone detection circuitry, tone generation circuitry and call conferencing circuits were typically all disposed on respective printed circuit boards comprising discrete components, and were rack mounted in a cabinet, such as a PABX equipment cabinet.

The prior art circuitry typically occupied considerable circuit board area, and was characterized by high cost, circuit complexity and little or no capacity for expansion. In addition, many of the prior art DSUs employed analog circuitry which was prone to distortion and low accuracy performance due to temperature drift, etc.

According to the present invention, a digital signal processing system is provided for implementing features such as digital tone generation, digital conferencing, DTMF tone detection, progress tone detection, and speech synthesis, as well as others. According to a preferred embodiment, the features are implemented digitally via a dedicated digital signal processing (DSP) module comprised of a digital signal processing chip, one or more random access memories and a programmable logic array (ULA) embodying DSP support logic circuitry for interfacing the DSP chip. One or more of such DSP modules are connected via time divided digital signal links to a dedicated digital crosspoint (DX) switch. A central processor or main controller supervises interaction between the DX switch and the DSP modules.

Unlike prior art DSUs which typically employed dedicated paths for circuit switching and messaging, according to the present invention circuit switching and message communication are combined on one or more shared DX links wherein the portions of the link bandwidth dedicated to messaging and circuit switching are controlled by the main controller and are dependent on which of the service features is being implemented. For instance, in the event the desired service feature requires a large amount of signal processing computation time to implement but has low input/output signal traffic, then relatively few circuit switch channels are allocated. However, if the feature requires little computation power but wide input/output bandwidth, a large number of circuit switch channels are allocated.

The DX switch is addressed by the main controller via parallel address and data ports in order to dynamically allocate channels for establishing message and circuit switch paths to each DSP module, and an interrupt handshaking scheme is implemented between the DX switch and DSP modules for controlling transmission of message information packets therebetween. The packets can be either applications programs for downloading to one or more of the DSP modules, or interrupt and control signals for supervising the timing and execution of the programs.

An important characteristic of the present invention is that a digital DX switch is utilized in connection with the one or more DSP modules for providing combined message and circuit switching via dynamically allocated message and circuit switch channels. Thus, a plurality of service features are accommodated with a minimum of circuit complexity and cost.

A better understanding of the present invention will be obtained with reference to the detailed description below in conjunction with the following drawings, in which.

Figure 1:
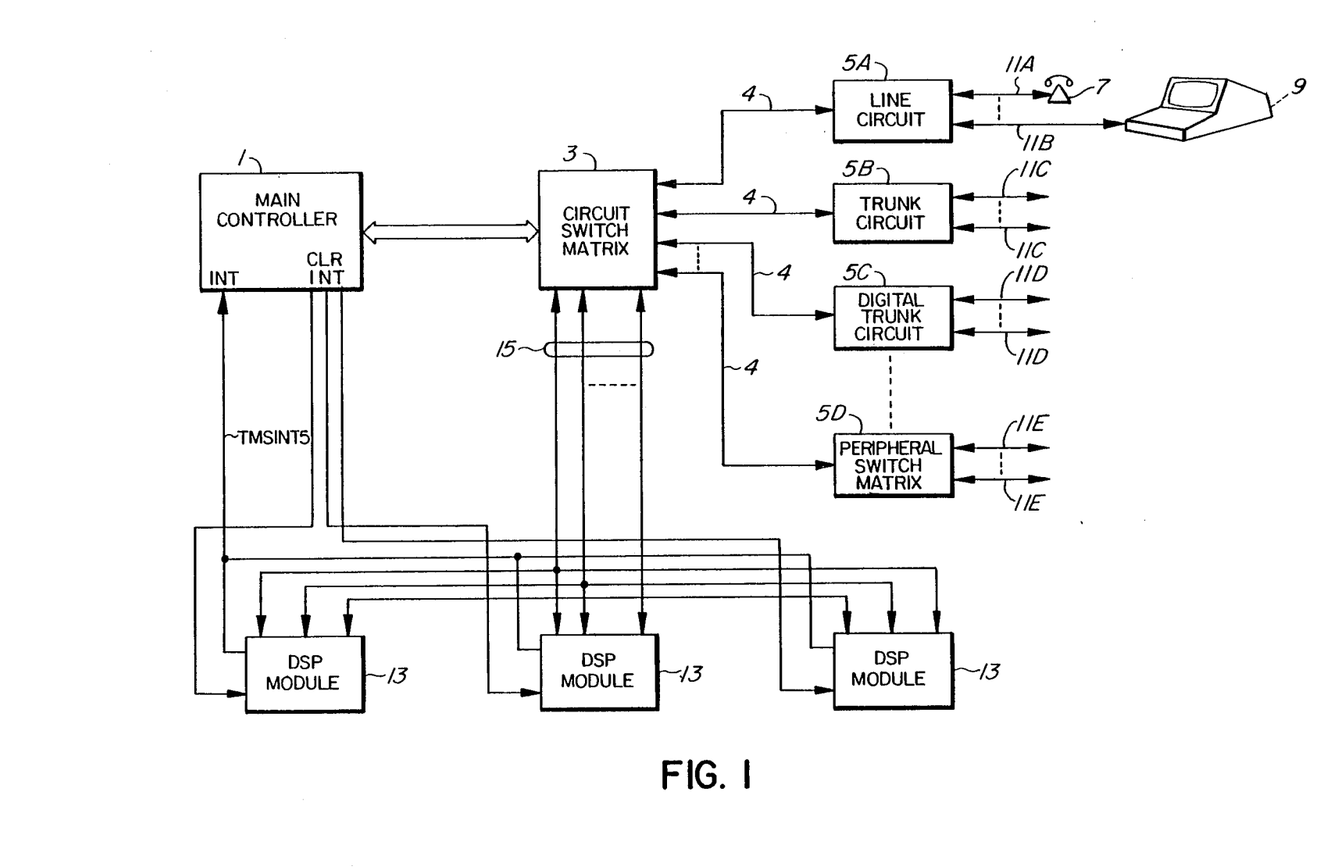
FIG. 1 is a block diagram of a digital signal processing system in accordance with the present invention.

With reference to FIG. 1, a main controller 1 is shown connected to a circuit switch matrix 3 having a plurality of input/output ports such as line and trunk circuits 5A–5C and a peripheral switch matrix 5D connected thereto. A subscriber set 7 and a data terminal 9 are shown connected to a representative one of the line circuits 5A via bidirectional PCM links 11A and 11B. PCM links 11A can be replaced by well known balanced bidirectional telephone lines in the event that the subscriber set 7 is a standard 500 type telephone set. In this case, the line circuit 5A typically also includes a digital-to-analog and analog-to-digital converter for translating between analog signals on the telephone line and PCM encoded signals transmitted to and from the circuit switch matrix 3.

Trunk lines may be connected to the trunk circuit 5B extending from a telephone central office via the lines 11C, and digital trunks (such as the industry standard T1 trunk) may be connected to the digital trunk circuit 5C. The peripheral switch matrix 5D may be connected via links 11E to additional expansion line and trunk circuits in a well known manner.

A plurality of DSP modules 13 are connected via dedicated PCM links 15 to the circuit switch matrix 3. Each of the DSP modules 13 has a control output thereof for generating an interrupt signal TMSINT 5 for interrupting the main controller 1. The TMSINT 5 signal output from individual ones of the DSP modules 13 is a high impedance output, and each signal is applied to a common interrupt line forming a logic OR function. The main controller 1 generates respective interrupt clear signals for resetting interrupts generated by the DSP modules 13.

In operation, the main controller 1 configures a predetermined switching element or DX switch (discussed below with reference to FIG. 2) of the circuit switch matrix 3 for dynamically allocating predetermined PCM channels of the shared links 15 for establishing a message signal path between the circuit switch matrix 3 and each DSP module 13. An interrupt handshaking scheme is utilized to establish communication between the main controller 1 and DSP modules 13 utilizing the aforementioned interrupt signals.

For example, a predetermined DSP module 13 can generate a TMSINT 5 interrupt control signal for application to the INT input of the main controller 1. In response, the main controller generates a message signal packet for transmission along a dedicated message signal channel of a predetermined dedicated message signal channel of a predetermined one of the PCM links 15 via circuit switch matrix 3, for storage in an internal memory of the DSP module 13. The main controller 1 then generates an appropriate clear interrupt signal via a CLRINT output thereof for causing the selected DSP module 13 to reset its TMSINT 5 signal output. The DSP module 13 then generates another TMSINT 5 interrupt signal for causing the main controller 1 to transmit a second message signal packet, and the procedure is repeated until an entire program has been downloaded.

The message signal packets can be, for instance, in the form of an applications program code for execution by one or more of the DSP modules 13, resulting in implementation of a predetermined service feature.

Once the internal memory of the DSP module 13 has been loaded with the applications program, the code is executed by the DSP module for performing one of either tone plant, digital conferencing, DTMF or ATD tone detection, speech synthesis, etc.

For example, in order to implement the speech synthesis service feature, one or more encoded messages are first stored on a disk (not shown), such as Winchester disk connected to the main controller 1. The main controller 1 then transmits the encoded messages to a predetermined one of the DSP modules 13 via allocated message channels of the PCM links 15 through circuit switch matrix 3. The selected DSP module 13 executes the stored applications program and converts the encoded messages into A-law or $\mu$-law encoded PCM signals and transmits the PCM signals via further allocated channels (circuit switch channels) of the PCM links 15 to one or more of the line or trunk circuits 5A-5D.

Since the PCM channels are dynamically allocated, as many or as few of the channels are utilized by a predetermined DSP module 13 as required for implementing the particular service feature. Thus, if the service feature requires considerable computation time for the applications program to be executed, the channel bandwidth is low (e.g. four or five allocated circuit switch channels are used for tone detection). However, if the DSP program requires little computation time but high signal throughput, a large number of circuit switch channels may be allocated, (for example forty-two channels are used for implementing the tone plant feature).

As a further example, digital conferencing can be implemented according to the present invention, by programming a predetermined one of the DSP modules 13 for receiving voice or tone signal samples from predetermined ones of the line, trunk or peripheral matrix circuits 5A-5D via the circuit switch matrix 3 and dedicated circuit switch channels of PCM links 15. The DSP module 13 detects the "loudest" one of the signal samples (i.e. the sample having the largest magnitude) and sends that sample to each of the signal sources connected to the line or trunk circuits 5A-5D except for the signal source from which it was generated. The second loudest signal sample is then transmitted to the source of the loudest signal sample.

The tone detection feature of the present invention can be implemented by a predetermined one or more of the DSP modules 13 by receiving a number of tone signal samples from one or more of the circuits 5A-5D via circuit switch matrix 3 and dedicated circuit switch channels of the PCM links 15, and performing thereon.

A well known tone detection algorithm performs a discrete Fourier transform on the received tone samples and generates a message signal along a further dedicated message signal channel of the PCM links 15 to the main controller 1, indicative of whether or not a predetermined DTMF tone is present.

Additional features can be performed by the digital signal processing system of the present invention. For example, type-written messages from a data terminal, such as data terminal 9, can be transmitted via line circuit 5A, through circuit switch matrix 3, and along a dedicated message channel of the PCM link 15 to a predetermined one of the DSP modules 13. In response, the DSP module 13 can implement a text-to-speech conversion algorithm or a direct speech synthesis algorithm for generating "canned messages" along further circuit switch channels of the PCM links 15 via circuit switch matrix 3 to other ones of the subscriber sets 7 or terminals connected to the input/output ports 5A-5D.

Thus, the digital signal processing system as illustrated in FIG. 1 provides many of the same features as prior art digital service units (DSUs), plus many more. However, as discussed above, prior art DSUs typically require dedicated paths for circuit switch signals and message signals, whereas according to the present invention both functions are dynamically allocated between single or multiple PCM links 15, wherein the proportion of channels devoted to either of message or circuit switch signalling varies as the application demands.

An important element of the system embodying the present invention is the DX switch, discussed in greater detail below with reference to FIG. 2. The DX switch is a combined programmable time and space switching circuit utilized within the circuit switch matrix 3 for dynamically allocating PCM channels of the links 15 to the DSP modules 13 in order to support simultaneous combined message and circuit switch signalling.

A detailed description of the DX switch can be found in Canadian patent No. 1,171,946 entitled TIME DIVISION SWITCHING SYSTEM, issued July 31, 1984 to Mitel Corporation, to which the reader is referred.

Figure 2:
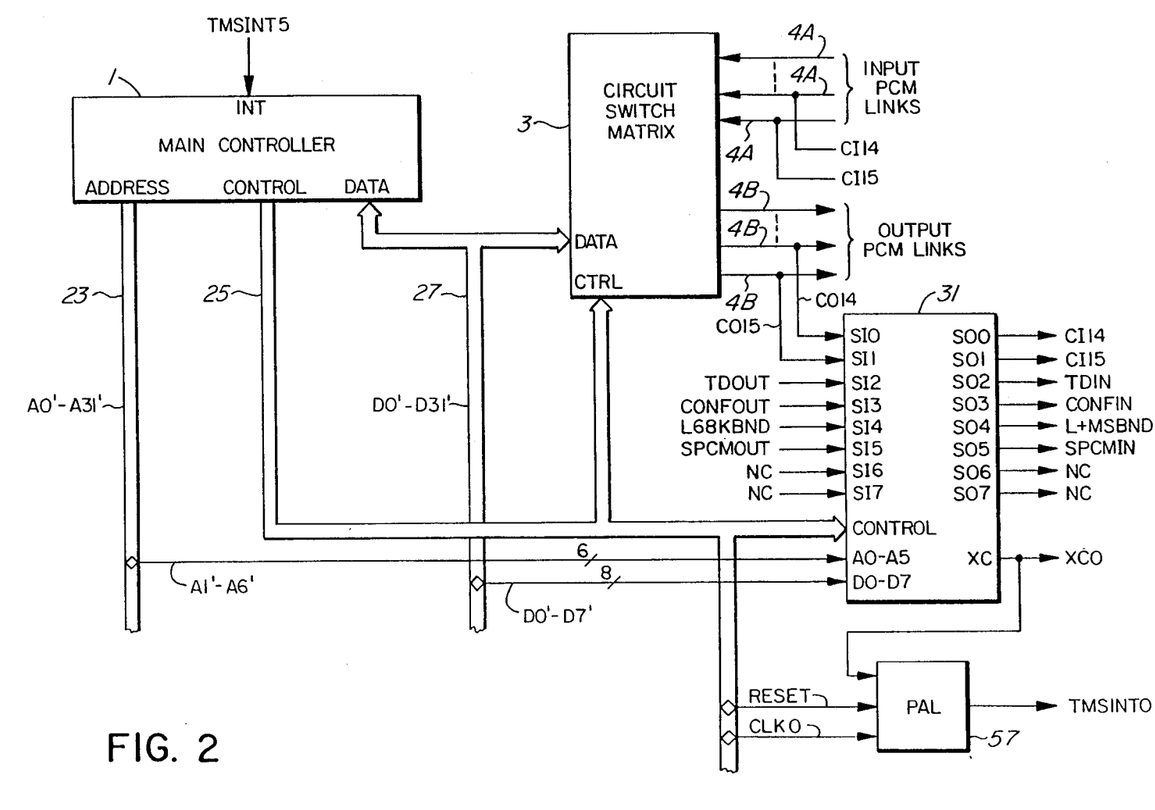
FIG. 2 is a block schematic diagram of a main controller, circuit switch matrix and dedicated digital DX switch according the the preferred embodiment of the present invention.

With reference to FIG. 2, the main controller 1 is shown in greater detail having an address bus 23, control bus 25 and data bus 27 connected thereto. The main controller typically includes a microprocessor, such as the Motorola MC68020 microprocessor in conjunction with support logic circuitry and one or more disk drives and RAM memory circuits (not shown). According to a successful prototype of the present invention, 4 megabytes of RAM were provided and the MC68020 was utilized for controlling a communication switching system with up to 300 lines, (such as the lines or links denoted as 11A-11E in FIG. 1).

According to the preferred embodiment, the address bus 23 is comprised of 32 address lines A0'-A31', the data bus 27 is comprised of 32 data lines D0'-D31' and the control bus 25 is comprised of a plurality of well known control signal carrying lines, such as READ/WRITE, CHIP ENABLE, RESET, and various timing and clock signals.

A PAL ™ device 61 is connected to predetermined lines of the control bus 25 designated RESET, TMSG, CLKOUT 0, CLKOUT 1 and CLKOUT 2, as well as to input and output ports of the circuit switch matrix 3 designated XCl and XC2, and to a DX switch 31 which generates the signal designated as XCO.

Circuit switch matrix 3 is connected to the main controller 1 via DATA and CTRL ports thereof, as well as preferably an address port (not shown). Input and output links 4A and 4B carry unidirectional circuit and message switch signals between various external input/output ports such as line circuit 5A, trunk circuit 5B, etc., as illustrated in FIG. 1.

The dedicated DX switch 31 is provided for dynamically allocating message and circuit switch channels of PCM links 15 (FIG. 1), and is shown for the purpose of explanation as being separate from the circuit switch matrix 3, but is actually incorporated as an element thereof.

DX switch 31 is preferably a programmable digital combined time and space division switch such as the Mitel Model MT8980 digital time/space crosspoint switch, as described in the aforementioned Canadian patent No. 1,171,946 of Mitel Corporation.

The patented DX switch 31 has a number of useful features, including the ability to receive message signals on the data inputs D0-D7 thereof for conversion to serial format and transmission along allocated message channels of the PCM links connected to serial output ports S00-S07. Similarly, serial message signals can be received on input ports S10-S17 and transmitted via parallel data ports D0-D7 to the main controller 1 along the data bus 27.

A predetermined pair (CI14 and CI15) of the input PCM links 4A are also connected to serial PCM output terminals SOO, and SOl of the DX switch 31, and a predetermined pair (C014 and C015) of the output PCM links 4B from matrix 3 are connected to serial input terminals SIO and SIl of the DX switch 31.

Serial inputs SI2 to SI4 and outputs S02-S04 are connected to various ones of the DSP modules 13 (FIG. 1). For example, the SI2 input and S02 output carry signals TDOUT and TDIN respectively, and are connected to a predetermined one of modules 13 for performing tone detection and tone generation. The SI3 input and S03 output carry signals denoted as CONFOUT and CONFIN respectively and are connected to a further DSP module 13 for performing digital conferencing of up to nineteen PCM channels, as discussed above. The SI4 input and S04 output carry signals L68kBND and LTMSBND respectively, and are connected to a further DSP module 13 for implementing a DTFM receiver or tone detection function, as described above.

Input SI5 and output S05 are connected to an HDLC protocoller (not shown) which is used to transmit and receive HDLC framed message signals from various circuit or message links, such as 11A-11E, etc. The HDLC protocoller does not form part of the present invention and will not be described in further detail.

The S16, S17 inputs and S06, S07 outputs are shown as being not connected. However, serial ports S16 and S06 can be connected, for example, to a maintenance panel for servicing or performing diagnostics, while the S17 and S07 ports can be connected to a mate processor for effecting a redundant back-up system.

The PAL TM device 61 synchronizes a timing interrupt signal received from the XC terminal of DX switch 31, to the synchronous clock associated with each of the DSP modules 13. This interrupt is used by applications software running in the DSP modules 13 to define event windows in which message or circuit switch data may be transmitted between the DSP modules 13 and DX switch 31.

While each of the DSP modules 13 is preferably of similar design, the applications programs which are executed serve to characterize the individual service features which are implemented thereby.

A detailed description of the operation of one of the DSP modules 13 as a DTMF tone detector, will now be described in detail, by way of example.

Figure 3:
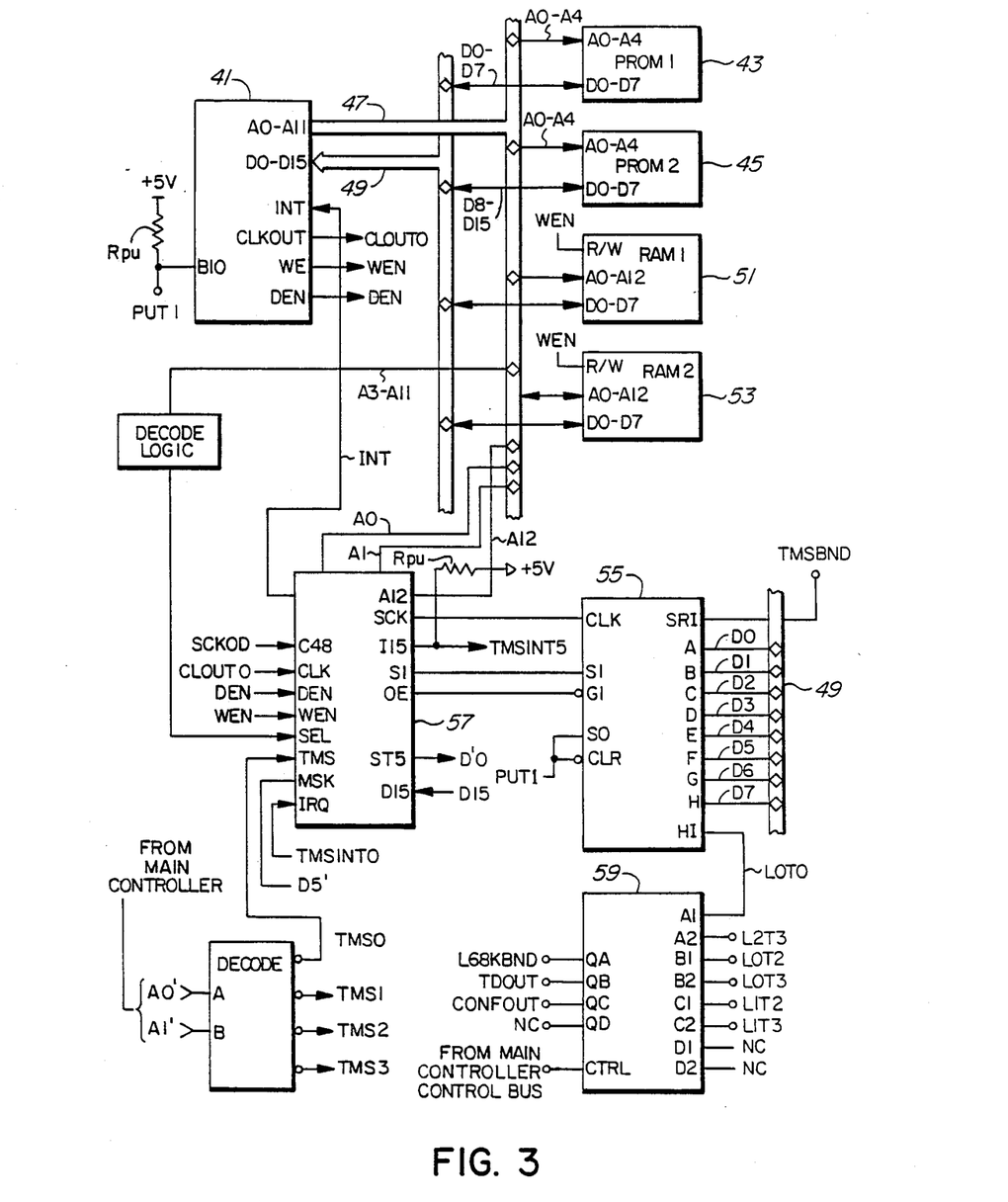
FIG. 3 is a block schematic diagram of a digital signal processing module according to the preferred embodiment.

With reference to FIG. 3, a representative one of the DSP modules 13 is shown in greater detail. A digital signal processing circuit 41, such as the TMS 320 model digital signal processor manufactured by Texas Instruments, is connected to address ports A0-A4 of a pair of programmable ROM circuits 43 and 45 via address bus 47, and data ports DO-D7 thereof via a data bus 49. The address and data buses are connected to A0-A11 and D0-D15 terminals respectively, of DSP circuit 41. The PROM circuits 43 and 45 contain a bootstrap program for initializing DSP circuit 41 to interrupt the main controller 1 (FIG. 2) in order to start receiving message packets containing the applications program code for storage in a pair of random access memories (RAMs) 51 and 53, as discussed above with reference to FIG. 1.

RAM circuits 51 and 53 have address inputs A0-A12 thereof connected to the address bus 47, and D0-D7 data terminals thereof connected to the data bus 49. READ/WRITE control terminals of the RAM circuits 51 and 53 are connected to a write enable output WE of DSP circuit 41 for receiving a write enable signal (WEN) therefrom.

A serial-to-parallel converter 55 receives the TMSBND signal from serial output S04 of the DX switch 31 (FIG. 2) on a serial input SRI thereof, and converts it to an eight bit parallel format for transmission via parallel A-H outputs to the D0-D7 data lines of data bus 49 connected to DSP circuit 41.

The serial-to-parallel converter 55 also received parallel format signals from data bus 49 and generates a serial PCM signal designated LOTO from a serial output HI thereof, for application to the A1 input of a multiplexer 59, which in turn passes the signal (designated as L68KBND) via the QA output thereof to the SI4 serial input terminal of DX switch 31 (FIG. 2), under control of the main controller 1.

Additional serial output signals L2TS, LOT3, LIT2 and LIT3 are applied to the A2, B1, B2, C1 and C2 inputs of multiplexer 59 respectively, from additional DSP modules 13 (not shown in detail) for implementing the aforementioned digital conferencing, tone plant, ATD tone detection service features, etc. These additional signals are multiplexed and appear on the QA, QB and QC outputs as L68KBND, TDOUT and CONFOUT, respectively.

A plurality of logic support circuits are embodied within a programmable array designated as PAL TM device 57, for controlling timing, enabling, and data transfer between the main controller 1, DSP circuit 41 and bidirectional serial-to-parallel converter 55.

In operation, during initialization, the main controller 1 establishes or allocates predetermined message signal paths through DX switch 31 for reception by DSP circuit 41 via converter 55. The main controller 1 then resets the DSP circuit 41 for causing execution of the bootstrap program stored in PROM circuits 43 and 45 in a well known manner. The bootstrap program causes DSP circuit 41 to generate an interrupt signal to the main controller 1 for initializing transfer of message signals between the main controller 1 and DSP circuit 41, as discussed above.

In particular, the DSP circuit 41 causes a TMSINT 5 tristate interrupt signal to be generated by PAL TM device 57 in response to a logic high signal appearing on the ST5 output thereof and a logic low signal being applied to the MSK input thereof. The signal appearing on the MSK input is received from the D5' data line of the data bus 27 connected to main controller 1 (FIG. 2). A logic high signal output from the ST5 output of PAL TM device 57 is generated in response to the occurrence of logic high signals being applied to the SEL, DEN and AO inputs and logic low signals being applied to the A1 and TMS inputs thereof. The logical operation of PAL TM device 57 is shown below with reference to the following truth table.

TABLE 1

```
A0 A1 /MSK /C48 CLK /DEN /WEN SEL /TMS GND
/IRQ /OE /ST5 /A12 SI /SCK /INT /IL5 /D15 VCC
IFD (SEL * DEN */A0*/A1)D15=/ST5      ; read with port 4
IF (VCC) INT    = /CLK * IRQ           ; interrupt to TMS
                + CLK * INT
                + INT * IRQ
IF (VCC) SCK    = C48
                + SEL * WEN * /A1 * /A0    ; Port 4 Write
IF (VCC) /SI    = /SCK                     ; the one load condition
                + /SEL                     ; all ram acceses
                + A1                       ; port 6,7 writes
                + A0                       ; port 5,7 writes
                + /WEN*/SI                 ; all reads
IF (VCC) A12    = SEL * DEN * A1 * /A0     ; page bit
                + A12 * /SEL               ; hold it
                + A12 * /DEN
                + A12 * /A1
                + A12 * /A0                ;hazard term for latching
IF (VCC) ST5    = SEL * DEN * /A1 * A0 * /TMS   ; interrupt bit
                + ST5 * /TMS
IF (ST5 * /MSK) IL5 = ST5 * /MSK           ; Tristate int
IF (VCC) OE = SEL * DEN * /A1 * /A0        ; Port 4 read
```

As soon as the main controller 1 receives the interrupt signal TMSINT 5, it writes a byte of message information for transmission via data bus 27 to the DO-D7 input of DX switch 31. DX switch 31 converts the parallel format message signal into serial format for transmission via the aforementioned serial output S04 (which comprises one of the aforementioned PCM links 15 discussed with reference to FIG. 1). The serial format message signal is received by serial-to-parallel converter 55 on the SRI input thereof. The converter 55 reconverts the serial message signal to parallel format for application to data bus 49 and storage in RAM circuits 51 and 53 under control of DSP circuit 41. Each time an interrupt is generated by DSP circuit 41, an internal counter of DSP circuit 41 is incremented, and the received message byte from main controller 1 is stored in RAM circuits 51 and 53, which according to the successful prototype were capable of storing up to a maximum of 16 k bytes.

Once the main controller 1 has written a new byte into the allocated message channel within DX switch 31, it generates a further signal via the control bus 25 for application to the PAL TM device 57 which in response generates a "clear interrupt" signal which clears the original interrupt signal TMSINT 5 and an internal interrupt status bit (ST5) thereof, which is periodically read by DSP circuit 41 from an input/output port thereof via the D15 data line.

As discussed above, the DSP circuit 41 according to the successful prototype, was a TMS 320 digital signal processing chip. The TMS 320 chip latches interrupts internally, such that a low signal appearing on the INT input thereof for one bit period is typically sufficient for causing an interrupt to occur.

The logical operation of PAL TM device 61 with respect to the aforementioned representative one of the DSP modules 13, is shown below with reference to the following truth Table 2.

TABLE 2

```
/RESET /XCO CLKO GND
/SO /TMSINTO VCC
;
; TMS interrupt synchronization
IF (/RESET) SO      = /CLKO* XCO          ; first stage
                    + CLKO* SO            ; latches on rising edge
                    + XCO * SO
IF (/RESET) TMSINTO  ; second stage
= CLKO* SO
                    + /CLKO* TMSINTO      ; latches on falling edge
                    + SO * TMSINTO
```

In actual fact PAL TM device 61 includes many more input and output terminals for connection to various additional DSP modules 13, (not shown) for controlling timing and synchronization thereof.

Thus, applications programs, such as service feature programs, are downloaded from the main controller 1 for storage in RAMs 51 and 53 thereby to be executed by DSP circuit 41 for implementing service features such as the aforementioned DTMF receiver function.

Having downloaded the program, the main controller 1 resets and initializes DSP circuit 41 by generating predetermined control signals to PAL TM device 57 for causing generation and application of an interrupt signal (INT) to the interrupt input of DSP circuit 41. This starts execution of the code from RAM circuits 51 and 53. The DX switch 31 is then configured to allocate predetermined message and circuit switch channels as required by the specific service feature being implemented.

During execution of the service feature applications program, the DX switch 31 generates a timing interrupt to DSP circuit 41 via the XC output thereof for controlling timing of execution of the program. In particular, an interrupt signal XCO is transmitted on a per time slot basis from DX switch 31, and depending on the particular program being executed by DSP circuit 41, the XCO signal can assume various formats. For example, three interrupts followed by a gap may indicate a message signal transfer, and six continuous interrupts may indicate a data transfer. The spacing which is used for message and data switching typically varies in relation to the particular program being implemented.

For example, when implementing the tone plant service feature, only one interrupt from the DX switch 31 is required to identify where the first PCM channel, (i.e., channel 0) will be located in the next PCM frame on the predetermined link 15. However, for the DTMF tone detector program, one message interrupt causes transmission of a message packet to the main controller 1 for indicating the occurrence or non-occurrence of a predetermined tone.

The XCO signal from DX switch 31 is synchronized and presented to the interrupt input INT of DSP circuit 41 via PAL ™ devices 61 and 57. In particular, the XCO signal from DX switch 31 is applied to an input of PAL ™ device 61 of the main controller 1 which in response generates the TMSINTO interrupt discussed above which is applied to the IRQ input of PAL ™ circuit 57. In response, and in accordance with the logic conditions discussed above in connection with Table 1, PAL ™ device 57 generates an INT interrupt signal for application to the INT input of DSP circuit 41.

The XCO interrupt received from the DX switch 31 also synchronizes the DSP circuit 41 with the timing on the PCM signal links 15 (FIG. 1) in order that it may read or write data to or from the serial-to-parallel converter 55 during predetermined channel time slots.

PCM signals are received by circuit switch matrix 3 on input PCM links 4A, and are switched therethrough for appearance on one or both of output PCM lines C014 and C015 which are applied to the SIO and SII serial input terminals of DX circuit 31, as discussed above. In response, DX circuit 31 switches the incoming PCM signal data in one or both of time and space, to appear on the S04 serial output terminal thereof in one or more predefined dynamically allocated channels.

The input PCM signals are received on the SRI input of converter 55 as discussed above, and presented to the data bus 49 for manipulation or processing via DSP circuit 41 to detect whether one or more DTMF tones are present, according to a predetermined algorithm implemented as a result of DSP circuit 41 executing a predetermined applications program.

DSP circuit 41 reads and writes data on data bus 49 for application to the converter 55 at specific times in accordance with the timing control provided by PAL ™ circuit 57. Thus, a message signal indicative of the presence or absence of DTMF tones is output in serial form via the HI output of converter 55 and transmitted to multiplexer 59 for appearance on the QA output thereof as the L68kBND signal, and also applied to the SI4 input of DX switch 31. The DX switch 31 passes the signal to circuit switch matrix 3, and from there to the main controller 1 or to the various input/output ports. The main controller 1 then takes appropriate action within the communication system such as, for example, configuring the circuit switch matrix 3 to interconnect two or more of the input/output ports to establish a communication link therebetween.

It will be understood that while the operation of one of the DSP modules 13 has been described in relation to implementation of a DTMF tone detection service feature, other features (such as tone plant, digital conferencing, speech synthesis, etc.,) can be performed by the DSP modules 13 in response to execution of appropriate applications programs downloaded from the main controller 1, as discussed above.

According to the successful prototype, each one of the PCM links 15 (FIG. 1) supports thirty-two channels of PCM or message signal communication per link, of which any given one of the DSP modules 13 can utilize up to sixteen channels depending on the signal bandwidth required. For example, a first DSP module 13 may use even channels while a second DSP module may use the odd channels.

As discussed, allocation of the channels can be either circuit switch based or message based. If the allocation is circuit switch based, the channels can be used to convey audio information between the input/output ports and the DSP modules 13, and message information between the main controller 1 and DSP modules 13, for implementing tone detection, conferencing, DTMF detection, tone generation, speech synthesis, etc.

According to the successful prototype, a system has been implemented utilizing a first single link DSP module 13, illustrated in FIG. 3, for implementing DTMF tone detection; a second dual link DSP module 13 for implementing digital tone conferencing, and a third triple link DSP module 13 for performing tone generation and tone detection via a two-channel DFT algorithm.

However, according to an alternative embodiment, it is proposed that a plurality of universal DSP modules 13 each having four links could be implemented, wherein all of the support logic connected to the DSP circuit 41, such as the PROMs 43 and 45, PAL ™ device 57, the serial-to-parallel converter 55, etc., would be incorporated within a single gate array. Each DSP module 13 would consist of four chips (i.e., DSP circuit 41, RAM circuits 51 and 53, and the gate array) all surface mounted on a small multi-layer circuit board. The modules would then be easily interchangeable, resulting in flexible system expansion and ease of installation, etc. Also, since the service features are implemented in software, maintenance and revision can be facilitated by simply providing the system with upgraded applications programs.

According to the proposed alternative embodiment, the XCO signal received from the DX circuit 31, would convey more information than merely interrupt signals. In particular, it is contemplated that the XC link will effectively support a thirty-two channel message communication path providing interrupt control, link output enable, and general device control for the DSP circuit 41.

Individual ones of the four circuit switch links 15 connected to a particular one of the modules 13, would be programmed on a per channel basis via the XC link, to be active. Thus, only the required number of channels would be allocated to an individual DSP module 13, to perform execution of a predetermined applications program. The interface to each of the PCM links 15 would be effected via a single buffer shift register, such as the serial-to-parallel converter 55 described above with reference to FIG. 3.

Each of the thirty-two XC message channel bytes would be comprised of four least significant bits which indicate which of the four possible links is to be enabled during the following time slot or channel, as well as four most significant bits for conveying command information such as channel byte control, resetting, running and reading of the DSP circuit 41 in either of the PROM or RAM modes, as well as controlling enabling of interrupts, masking of interrupts, etc.

Thus for example, if the most significant bit is a zero, the next three bits would indicate where the interrupt occurs from the DX circuit 31 to the DSP module 13 in terms of bit position in the following channel.

Alternatively, if the most significant bit is a logic 1, then the next three significant bits would designate one of either an idle command (no operation), or seven other commands for doing different instructions, such as reading the PROM or RAM circuits, etc., as discussed above.

Thus, the service feature programs executed by the DSP circuits 41 would utilize dynamically allocated channels (seven channels, nine channels, or three channels, etc.,) depending on the bandwidth requirements of a particular application as opposed to the embodiment described with reference to FIGS. 2 and 3 wherein sixteen channels are automatically allocated to each of the DSP modules 13. The alternative embodiment is expected to result in higher efficiency of utilization of individual ones of the DX links 15, and facilitate allocation of functions to a plurality or "pool" of DSP modules 13.

A person understanding the present invention may conceive of other embodiments or variations thereof.

For instance, the DSP modules 13 may be utilized to process data signals from input/output ports connected to data sources. For example, the circuit switch matrix 3 can be connected to receive and transmit data signals to and from one or more HDLC protocollers, as discussed above. The data signals can then be coded, reformatted, encrypted, etc., via the one or more DSP modules 13 executing predetermined applications programs.

All such embodiments or variations are considered to be within the sphere and scope of the present invention as defined by the claims appended hereto.

We claim:

1. A digital signal processing system for use in a communication system connected to a plurality of input/output ports, comprised of:
    (a) main controller means for transmitting and receiving message signals,
    (b) digital signal processing means for implementing one or more service features characterized by one or both of transmission and reception of both of PCM and message signals, and
    (c) digital switching means connected to said main controller means, digital signal processing means, and input/output ports, for bidirectionally translating PCM and message signals therebetween, via one or more time divided communication links under control of said main controller means, and
    (d) means for dynamically allocating predetermined channels of said one or more time divided communication links for PCM and message signal translation, wherein the proportion of channels allotted to PCM and message signal translation is dependent on which of said one or more service features is being implemented, thereby maintaining high signal bandwidth efficiency of said PCM and message signal translation.

2. A digital signal processing system as defined in claim 1, wherein said digital switching means is comprised of a combination space and time division switching matrix.

3. A digital signal processing system as defined in claim 2, wherein said digital signal processing means is comprised of one or more memory circuits for storing a predetermined service feature applications program, and a programmable digital signal processor for executing said program and implementing a predetermined one of said service features in response thereto.

4. A digital signal processing system as defined in claim 3, wherein said digital signal processing means further includes one or more bidirectional serial-to-parallel converters for interfacing a parallel port of said digital signal processor with one or more serial links of said time division switching matrix.

5. A digital signal processing system as defined in claim 4, wherein said digital signal processing means further includes one or more read only memory circuits for storing a bootstrap program for initializing said digital signal processor.

6. A digital signal processing system as defined in claim 5, wherein said serial-to-parallel converters and read only memory circuits are embodied in a single chip gate array.

7. A digital signal processing system as defined in claim 1, including means for establishing an interrupt channel between said main controller means and digital signal processing means for controlling bidirectional communication of message signals therebetween.

8. A digital signal processing system as defined in claim 1, further including means for establishing an interrupt channel between said digital switching means and said digital signal processing means for controlling bidirectional communication of PCM signals therebetween.

9. A digital signal processing system as defined in claim 1, wherein implementation of a predetermined one of said service features is characterized by said main controller means generating a message signal designating a predetermined tone frequency for transmission on a predetermined one of said allocated channels, and digital signal processing means receiving said message signal, and in response generating a PCM tone signal at said predetermined frequency for transmission to one or more of said input/output ports on further predetermined ones of said allocated channels.

10. A digital signal processing system as defined in claim 1, wherein implementation of a predetermined at least one of said service features is characterized by said digital signal processing means receiving PCM signals from predetermined ones of said input/output ports on predetermined ones of said allocated channels, detecting the relative magnitudes of respective ones of said PCM signals, and transmitting the PCM signal of second largest magnitude to the port from which the PCM signal of largest magnitude is received on a further one of said allocated channels, and transmitting the PCM signal of largest magnitude to all other ones of said ports on additional ones of said allocated channels, whereby a digital conference call is established between said predetermined ports.

11. A digital signal processing system as defined in claim 1, wherein implementation of a predetermined one of said service features is characterized by said digital signal processing means receiving PCM signals from a predetermined one or more of said input/output ports along predetermined ones of said allocated channels, detecting the presence of one or more DTMF tone signals therein, and generating message signals representative of said detected DTMF tone signals, for transmission to said main controller means on further predetermined ones of said allocated channels.

12. A digital signal processing system as defined in claim 1, wherein implementation of a predetermined one of said service features is characterized by said digital signal processing means receiving PCM signals from a predetermined one or more of said input/output ports along predetermined ones of said allocated channels, detecting the presence of one or more ATD tone signals therein, and generating message signals representative of said detected ATD tone signals, for transmission to said main controller means on further predetermined ones of said allocated channels.

13. A digital signal processing system as defined in claim 1, wherein implementation of a predetermined one of said service features is characterized by said main controller means generating a predetermined message signal in the form of digital speech samples for transmission on a predetermined one or more of said allocated channels to be received by said digital signal processing means which in response converts said speech signals into PCM speech signals and transmits said PCM speech signals to a predetermined one or more of said input/output ports via additional ones of said allocated channels.

14. A digital signal processing system as defined in claim 1, wherein said digital signal processing means transmits successive interrupt signals to said main controller means for initiating transfer of successive message signals from said main controller means thereto via said digital switching means, and said main controller means generates control signals to said digital signal processing thereby enabling further message signals to be transmitted.

15. A digital signal processing system as defined in claim 1, wherein said digital switching means transmits an interrupt signal to said digital signal processing means along a dedicated message link for synchronizing PCM signal transmission along said allocated channels therebetween.

16. A digital signal processing system as defined in claim 1, said digital signal processing means being further comprised of first, second and third DSP modules for implementing first, second and third ones of said service features, respectively, said first service feature being multi-channel DTMF tone detection, said second feature being digital call conferencing, and said third feature being programmable tone generation and detection.

17. A digital signal processing system as defined in claim 16, wherein said first DSP module provides up to five PCM channels of simultaneous DTMF tone detection, said second module provides up to nineteen channels of digital call conferencing for supporting nine conference calls, and said third module provides a thirty-seven tone plant and two PCM channels of DFT tone detection.

18. A digital signal processing system as defined in claim 17, wherein three dedicated PCM links interconnect said digital switching means with said first, second and third DSP modules, odd channels being allocated to said first and second modules, and even channels of said three PCM links being allocated to said third modules.

19. A digital signal processing system as defined in claim 1, wherein said digital switching means transmits a command byte to said digital signal processing means for enabling implementation of said one or more service features.

* * * * *